US010834177B2

(12) United States Patent
Kleinheksel et al.

(10) Patent No.: US 10,834,177 B2
(45) Date of Patent: Nov. 10, 2020

(54) SYSTEM AND METHOD FOR DYNAMIC ACTIVATION OF REAL-TIME STREAMING DATA OVERFLOW PATHS

(71) Applicant: International Business Machines Corporation, Armonk, NY (US)

(72) Inventors: Cory J. Kleinheksel, Ames, IA (US);
David M. Koster, Rochester, MN (US);
Jason A. Nikolai, Rochester, MN (US);
Christopher R. Sabotta, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 15/589,022

(22) Filed: May 8, 2017

(65) Prior Publication Data
US 2018/0324069 A1 Nov. 8, 2018

(51) Int. Cl.
*H04L 29/08* (2006.01)
*H04L 12/26* (2006.01)

(52) U.S. Cl.
CPC .......... *H04L 67/1002* (2013.01); *H04L 67/10* (2013.01); *H04L 67/125* (2013.01); *H04L 43/0817* (2013.01)

(58) Field of Classification Search
CPC ............ H04L 43/0805; H04L 41/0813; H04L 67/1002
See application file for complete search history.

(56) References Cited

U.S. PATENT DOCUMENTS

| 9,146,775 | B2 | 9/2015 | Branson et al. | |
|---|---|---|---|---|
| 9,361,378 | B2* | 6/2016 | Miyasato | G06Q 50/01 |
| 10,042,611 | B2* | 8/2018 | Barsness | G06F 8/36 |
| 2009/0319687 | A1* | 12/2009 | Goldstein | G06F 9/5083 |
| | | | | 709/241 |
| 2010/0124196 | A1* | 5/2010 | Bonar | H04B 7/0689 |
| | | | | 370/329 |

(Continued)

OTHER PUBLICATIONS

Schneider et al., "Auto-Parallelizing Stateful Distributed Streaming Applications," 21st International Conference on Parallel Architectures and Compilation Techniques, 2012, PACT 12, Sep. 19-23, 2012, pp. 1-11.

*Primary Examiner* — Philip J Chea
*Assistant Examiner* — Wuji Chen
(74) *Attorney, Agent, or Firm* — Robert C. Bunker

(57) ABSTRACT

A method, computer program product, and computer system for defining, on at least one processor, one or more potential overflow paths for processing at least a portion of a data load through a plurality of stream operators deployed on a plurality of computing devices. Embodiments may include determining, on the at least one processor, a conditional availability for each computing device of the plurality of computing devices. Embodiments may also include identifying, on the at least one processor, a change in one or more of a configuration of the plurality of computing devices and the at least a portion of the data load. Embodiments may further include dynamically activating, on the at least one processor, one or more potential overflow paths in response to the identified change based upon, at least in part, the conditional availability for each computing device of the plurality of computing devices.

17 Claims, 8 Drawing Sheets

(56) References Cited

U.S. PATENT DOCUMENTS

| | | | |
|---|---|---|---|
| 2011/0083046 A1* | 4/2011 | Andrade | G06F 11/0793 |
| | | | 714/47.1 |
| 2012/0166582 A1* | 6/2012 | Binder | H04L 63/18 |
| | | | 709/217 |
| 2013/0330055 A1* | 12/2013 | Zimmermann | G06F 16/78 |
| | | | 386/240 |
| 2014/0025796 A1* | 1/2014 | Vibhor | H04L 67/1097 |
| | | | 709/222 |
| 2014/0122557 A1 | 5/2014 | Branson et al. | |
| 2014/0143431 A1* | 5/2014 | Watson | H04L 65/4084 |
| | | | 709/227 |
| 2015/0081879 A1* | 3/2015 | Branson | G06F 16/24568 |
| | | | 709/224 |
| 2015/0149507 A1* | 5/2015 | Imaki | G06F 16/24568 |
| | | | 707/798 |
| 2015/0154055 A1 | 6/2015 | Branson et al. | |
| 2015/0372911 A1* | 12/2015 | Yabusaki | H04L 67/34 |
| | | | 709/226 |
| 2016/0065449 A1* | 3/2016 | Pani | H04L 45/125 |
| | | | 370/235 |
| 2016/0110228 A1* | 4/2016 | Zhang | H04L 29/08 |
| | | | 718/104 |
| 2016/0140001 A1* | 5/2016 | Kulkarni | G06F 11/2033 |
| | | | 714/4.12 |
| 2018/0225100 A1* | 8/2018 | Cook | G06F 8/41 |

* cited by examiner

SYSTEM AND METHOD FOR DYNAMIC ACTIVATION OF REAL-TIME STREAMING DATA OVERFLOW PATHS

BACKGROUND

In general, streams graphs may be composed of a set of connected logical operations. Each logical operation may be capable of being deployed by itself or in conjunction with another logical operator. Several potential data routes for streaming data through a streams graph may exist. However, not all routes may be created equal and some routes may not have existed for a data processing section due to previously not having experienced congestion. It may be of interest to manage transient resources in these potential data routes and the manner in which these potential data routes may be deployed.

BRIEF SUMMARY OF DISCLOSURE

In one example implementation, a method, performed by at least one processor, may include defining, on the at least one processor, one or more potential overflow paths for processing at least a portion of a data load through a plurality of stream operators deployed on a plurality of computing devices. The method may include determining, on the at least one processor, a conditional availability for each computing device of the plurality of computing devices. The method may also include identifying, on the at least one processor, a change in one or more of a configuration of the plurality of computing devices and the at least a portion of the data load. The method may further include dynamically activating, on the at least one processor, one or more potential overflow paths in response to the identified change based upon, at least in part, the conditional availability for each computing device of the plurality of computing devices.

One or more of the following example features may be included. In some embodiments, dynamically activating one or more potential overflow paths may include streaming a first portion of the data load through the plurality of stream operators deployed on the plurality of computing devices via an original path and streaming a second portion of the data load through the plurality of stream operators deployed on the plurality of computing devices via a first overflow path of the one or more potential overflow paths in response to the identified change based upon, at least in part, the conditional availability for each computing device of the plurality of computing devices. In some embodiments, the data load may be divided between the original path and the first overflow path. The method may also include sampling, on the at least one processor, one or more system state variables of each computing device of the plurality of computing devices during run time of one or more streaming applications. In some embodiments, the one or more sampled system state variables may include, but are not limited to, one or more of CPU capability, memory capability, disk utilization, I/O capability, and virtual memory capability.

The method may further include generating one or more best fit models for application patterns based upon, at least in part, the sampled system state variables of each computing device. In some embodiments, the one or more best fit models are may be configured for one or more of duplicating processing elements, creating and removing dynamic connections, and/or optimizing graph flows. In some embodiments, identifying a change in one or more of the configuration of the plurality of computing devices and the at least a portion of the data load may include predicting a change in one or more of the configuration of the plurality of computing devices and the at least a portion of the data load based upon, at least in part, the conditional availability for each computing device of the plurality of computing devices. In some embodiments, dynamically activating one or more potential overflow paths in response to the identified change may include dynamically activating one or more potential overflow paths in response to the predicted change based upon, at least in part, the conditional availability for each computing device of the plurality of computing devices. The method may further include creating one or more pools of computing devices having one or more common characteristics and dynamically interchanging one or more computing devices included in at least one of the potential overflow paths with one or more computing devices from the same pool of the one or more pools of computing devices in response to the identified change based upon, at least in part, the conditional availability for each computing device of the plurality of computing devices.

In another example implementation, a computer program product including a non-transitory computer readable storage medium may have a plurality of instructions stored thereon, which, when executed by a processor, may cause the processor to perform operations that may include defining one or more potential overflow paths for processing at least a portion of a data load through a plurality of stream operators deployed on a plurality of computing devices. Instructions may be included for determining a conditional availability for each computing device of the plurality of computing devices. Instructions may also be included identifying a change in one or more of a configuration of the plurality of computing devices and the at least a portion of the data load. Instructions may further be included for dynamically activating one or more potential overflow paths in response to the identified change based upon, at least in part, the conditional availability for each computing device of the plurality of computing devices.

One or more of the following example features may be included. In some embodiments, dynamically activating one or more potential overflow paths may include streaming a first portion of the data load through the plurality of stream operators deployed on the plurality of computing devices via an original path and streaming a second portion of the data load through the plurality of stream operators deployed on the plurality of computing devices via a first overflow path of the one or more potential overflow paths in response to the identified change based upon, at least in part, the conditional availability for each computing device of the plurality of computing devices. In some embodiments, the data load may be divided between the original path and the first overflow path. Instructions may also be included for sampling, on the at least one processor, one or more system state variables of each computing device of the plurality of computing devices during run time of one or more streaming applications. In some embodiments, the one or more sampled system state variables may include, but are not limited to, one or more of CPU capability, memory capability, disk utilization, I/O capability, and virtual memory capability.

Instructions may further be included for generating one or more best fit models for application patterns based upon, at least in part, the sampled system state variables of each computing device. In some embodiments, the one or more best fit models may be configured for one or more of duplicating processing elements, creating and removing dynamic connections, and/or optimizing graph flows. In some embodiments, identifying a change in one or more of the configuration of the plurality of computing devices and the at least a portion of the data load may include predicting a change in one or more of the configuration of the plurality of computing devices and the at least a portion of the data load based upon, at least in part, the conditional availability for each computing device of the plurality of computing devices. In some embodiments, dynamically activating one or more potential overflow paths in response to the identified change may include dynamically activating one or more potential overflow paths in response to the predicted change based upon, at least in part, the conditional availability for each computing device of the plurality of computing devices. Instructions may further be included for creating one or more pools of computing devices having one or more common characteristics and dynamically interchanging one or more computing devices included in at least one of the potential overflow paths with one or more computing devices from the same pool of the one or more pools of computing devices in response to the identified change based upon, at least in part, the conditional availability for each computing device of the plurality of computing devices.

In another example implementation, a computing system comprising a processor and a memory module coupled with the processor may be provided, the processor may be configured for defining one or more potential overflow paths for processing at least a portion of a data load through a plurality of stream operators deployed on a plurality of computing devices. Instructions may be included for determining a conditional availability for each computing device of the plurality of computing devices. The processor may also be configured for identifying a change in one or more of a configuration of the plurality of computing devices and the at least a portion of the data load. The processor may further be configured for dynamically activating one or more potential overflow paths in response to the identified change based upon, at least in part, the conditional availability for each computing device of the plurality of computing devices.

One or more of the following example features may be included. In some embodiments, dynamically activating one or more potential overflow paths may include streaming a first portion of the data load through the plurality of stream operators deployed on the plurality of computing devices via an original path and streaming a second portion of the data load through the plurality of stream operators deployed on the plurality of computing devices via a first overflow path of the one or more potential overflow paths in response to the identified change based upon, at least in part, the conditional availability for each computing device of the plurality of computing devices. In some embodiments, the data load may be divided between the original path and the first overflow path. The processor may also be configured for sampling, on the at least one processor, one or more system state variables of each computing device of the plurality of computing devices during run time of one or more streaming applications. In some embodiments, the one or more sampled system state variables may include, but are not limited to, one or more of CPU capability, memory capability, disk utilization, I/O capability, network availability, and virtual memory capability.

The processor may further be configured for generating one or more best fit models for application patterns based upon, at least in part, the sampled system state variables of each computing device. In some embodiments, the one or more best fit models may be configured for one or more of duplicating processing elements, creating and removing dynamic connections, and/or optimizing graph flows. In some embodiments, identifying a change in one or more of the configuration of the plurality of computing devices and the at least a portion of the data load may include predicting a change in one or more of the configuration of the plurality of computing devices and the at least a portion of the data load based upon, at least in part, the conditional availability for each computing device of the plurality of computing devices. In some embodiments, dynamically activating one or more potential overflow paths in response to the identified change may include dynamically activating one or more potential overflow paths in response to the predicted change based upon, at least in part, the conditional availability for each computing device of the plurality of computing devices. The processor may further be configured for creating one or more pools of computing devices having one or more common characteristics and dynamically interchanging one or more computing devices included in at least one of the potential overflow paths with one or more computing devices from the same pool of the one or more pools of computing devices in response to the identified change based upon, at least in part, the conditional availability for each computing device of the plurality of computing devices.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

DETAILED DESCRIPTION

Figure 1:
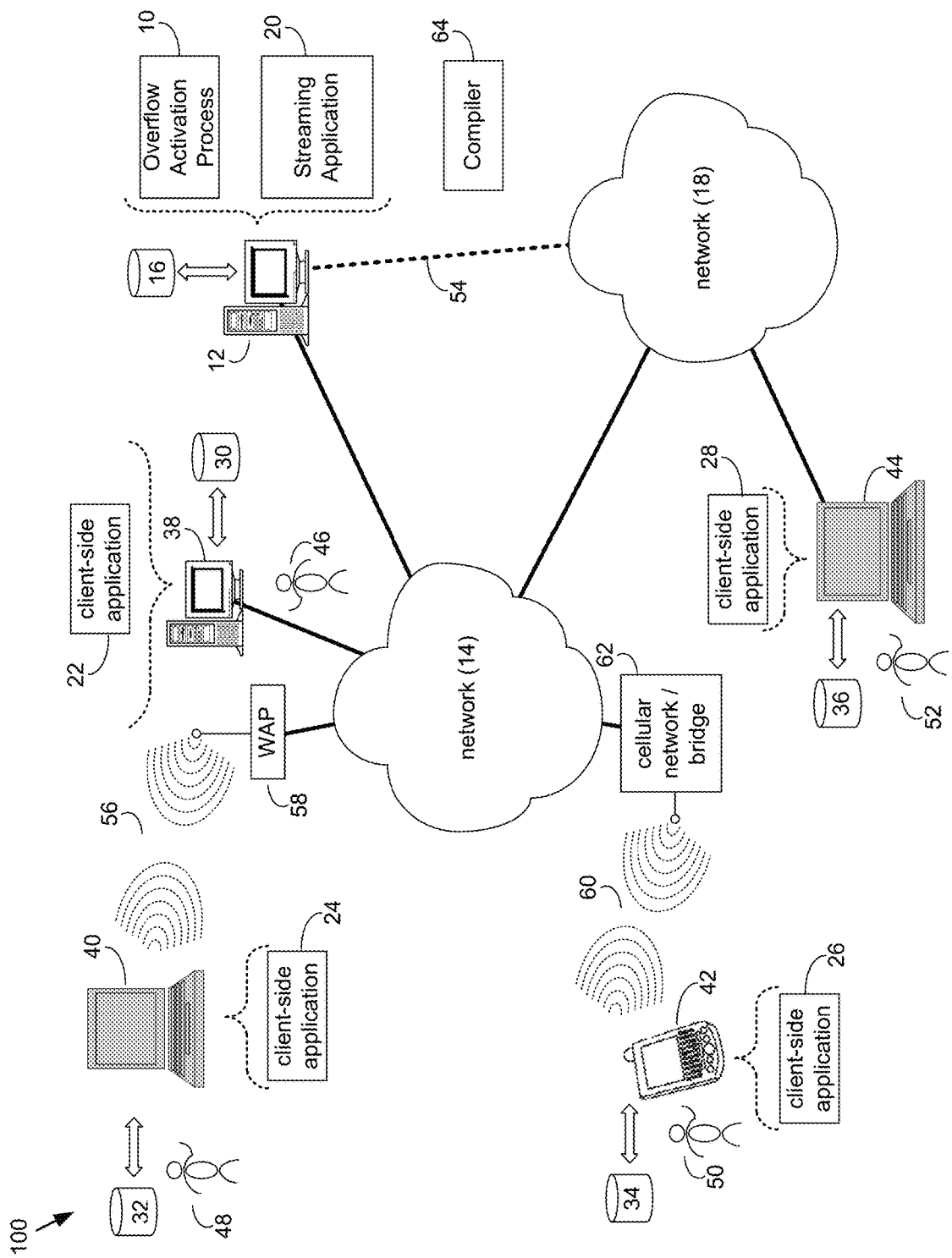
FIG. 1 is an example diagrammatic view of overflow activation process coupled to a distributed computing network according to one or more example implementations of the disclosure.

System Overview:

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is shown overflow activation process 10 that may reside on and may be executed by a server (e.g., server 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Server 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, overflow activation process 10 may include defining one or more potential overflow paths for processing at least a portion of a data load through a plurality of stream operators deployed on a plurality of computing devices. Overflow activation process 10 may include determining a conditional availability for each computing device of the plurality of computing devices. Overflow activation process 10 may also include identifying a change in one or more of a configuration of the plurality of computing devices and the at least a portion of the data load. Overflow activation process 10 may further include dynamically activating one or more potential overflow paths in response to the identified change based upon, at least in part, the conditional availability for each computing device of the plurality of computing devices.

The instruction sets and subroutines of overflow activation process 10, which may be stored on storage device 16 coupled to server 12, may be executed by one or more processors (not shown) and one or more memory architectures (not shown) included within server 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Overflow activation process 10 may be a stand-alone application that interfaces with an applet/application that is accessed via client applications 22, 24, 26, 28. In some embodiments, overflow activation process 10 may be, in whole or in part, distributed in a cloud computing topology. In this way, server 12 and storage device 16 may refer to multiple devices, which may also be distributed throughout network 14 and/or network 18. Additionally, while server 12 is shown as a single computing device, in some implementations, a streaming application may be executed on/across multiple computing devices (e.g., with one or more operations being performed by the various computing devices). Server 12 may include multiple computing devices connected to one another via network 14 and/or network 18. As such, while only a single computing device is shown, in some implementations, multiple computing devices may be utilized in the execution of a streaming application.

Server 12 may execute a streaming application (e.g., streaming application 20), examples of which may include, but are not limited to, e.g., IBM Streams, or other application that allows for the analysis and correlation of information from data stream sources. Streaming application 20 may also be referred to as stream computing application 20 and stream processing application. Overflow activation process 10 and/or streaming application 20 may be accessed via client applications 22, 24, 26, 28. For example, client electronic devices 38, 40, 42, 44 may create, implement, upload, and/or modify a streaming application on server 12 via client applications 22, 24, 26, 28. Overflow activation process 10 may be a stand-alone application, or may be an applet/application/script/extension that may interact with and/or be executed within streaming application 20, a component of streaming application 20, and/or one or more of client applications 22, 24, 26, 28. Streaming application 20 may be a stand-alone application, or may be an applet/application/script/extension that may interact with and/or be executed within overflow activation process 10, a component of overflow activation process 10, and/or one or more of client applications 22, 24, 26, 28. One or more of client applications 22, 24, 26, 28 may be a stand-alone application, or may be an applet/application/script/extension that may interact with and/or be executed within and/or be a component of overflow activation process 10 and/or streaming application 20. Examples of client applications 22, 24, 26, 28 may include, but are not limited to, e.g., IBM Streams, or other application that allows for the analysis and correlation of information from data stream sources, a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or server 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of overflow activation process 10 (and vice versa). Accordingly, overflow activation process 10 may be a purely server-side application, a purely client-side application, or a hybrid server-side/client-side application that is cooperatively executed by one or more of client applications 22, 24, 26, 28 and/or overflow activation process 10.

One or more of client applications 22, 24, 26, 28 may be configured to effectuate some or all of the functionality of streaming application 20 (and vice versa). Accordingly, streaming application 20 may be a purely server-side application, a purely client-side application, or a hybrid server-side/client-side application that is cooperatively executed by one or more of client applications 22, 24, 26, 28 and/or streaming application 20. As one or more of client applications 22, 24, 26, 28, overflow activation process 10, and streaming application 20, taken singly or in any combination, may effectuate some or all of the same functionality, any description of effectuating such functionality via one or more of client applications 22, 24, 26, 28, overflow activation process 10, streaming application 20, or combination thereof, and any described interaction(s) between one or more of client applications 22, 24, 26, 28, overflow activation process 10, streaming application 20, or combination thereof to effectuate such functionality, should be taken as an example only and not to limit the scope of the disclosure.

Users 46, 48, 50, 52 may access server 12 and overflow activation process 10 (e.g., using one or more of client electronic devices 38, 40, 42, 44) directly through network 14 or through secondary network 18. Further, server 12 may be connected to network 14 through secondary network 18, as illustrated with phantom link line 54. Overflow activation process 10 may include one or more user interfaces, such as browsers and textual or graphical user interfaces, through which users 46, 48, 50, 52 may access overflow activation process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some embodiments, server 12 may include a compiler 64 for compiling streaming application 20 and/or deploying a plurality of stream operators on a plurality of computing devices.

Figure 2:
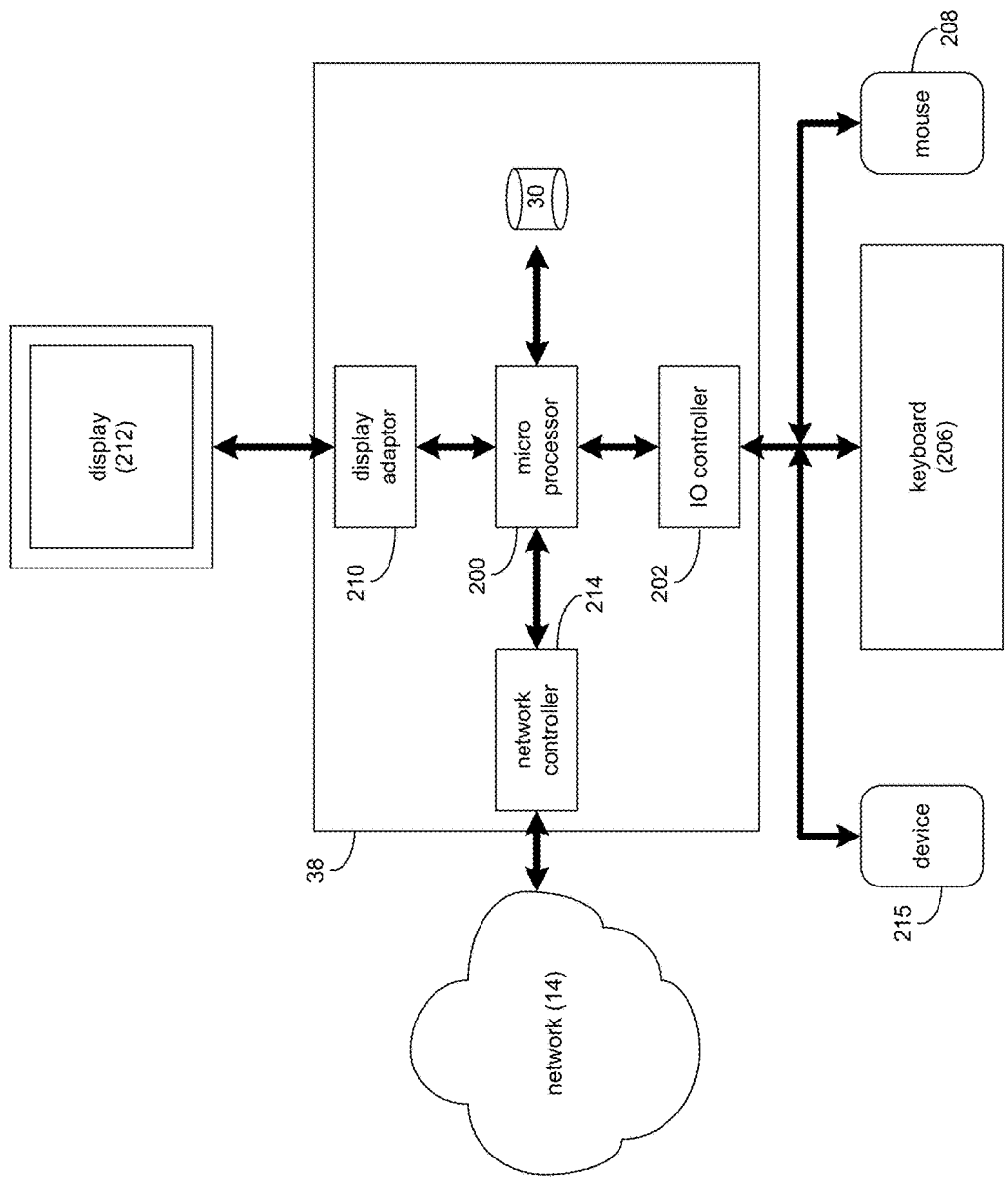
FIG. 2 is an example diagrammatic view of a client electronic device of FIG. 1 according to one or more example implementations of the disclosure.
Figure 3:
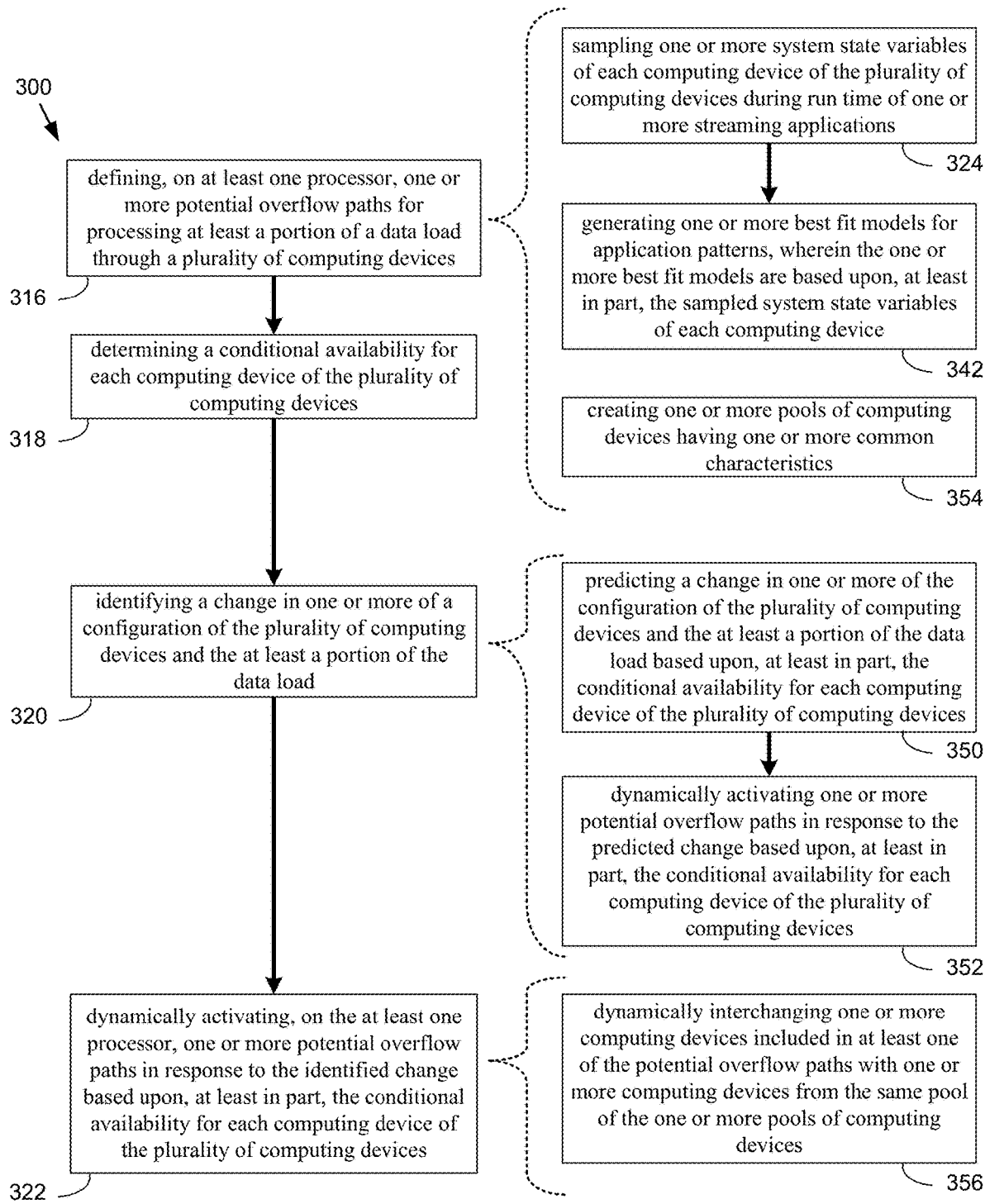
FIG. 3 is an example flowchart of the overflow activation process of FIG. 1 according to one or more example implementations of the disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, overflow activation process 10 may be substituted for client electronic device 38 within FIG. 2, examples of which may include but are not limited to server 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

As discussed above and referring also at least to FIGS. 3-8, overflow activation process 10 may define 316 one or more potential overflow paths for processing at least a portion of a data load through a plurality of stream operators deployed on a plurality of computing devices. Overflow activation process 10 may include determining 318 a conditional availability for each computing device of the plurality of computing devices. Overflow activation process 10 may also include identifying 320 a change in one or more of a configuration of the plurality of computing devices and the at least a portion of the data load. Overflow activation process 10 may further include dynamically activating 322 one or more potential overflow paths in response to the identified change based upon, at least in part, the conditional availability for each computing device of the plurality of computing devices.

As generally discussed above with reference to FIG. 3, overflow activation process 10 may define 316 one or more potential overflow paths for processing at least a portion of a data load through a plurality of stream operators deployed on a plurality of computing devices. The plurality of computing devices, as used herein may include, but are not limited to, one or more personal computers, one or more server computers, one or more series of server computers, one or more mini computers, one or more mainframe computers, or a one or more dedicated network devices. Examples of a computing device, of the plurality of computing devices, may include server 12 as shown in FIG. 1. However, other computing devices are within the scope of the present disclosure.

In some embodiments, one or more streams graphs may be defined. A streams graph, as used herein, may be composed of a set of logical operations that may all be connected. In a stream computing application, a plurality of logical operations, or stream operators, may be connected to one another such that data flows from one stream operator to the next (e.g., over a TCP/IP socket). When a stream operator of the plurality of stream operator receives data, it may perform logical operations which may change the tuple by adding or subtracting attributes, and/or updating the values of existing attributes within the tuple. When the operation is complete, a new tuple may be output and sent to the next stream operator.

In some embodiments, each logical operation may be referred to as a "stream operator". In some embodiments, stream operators in a stream computing application or streaming application may be fused together to form a processing element that is executable. In some embodiments, the processing elements may share a common process space, resulting in much faster communication between stream operators than is available using inter-process communication techniques. In some embodiments, one or more processing elements, capable of processing a tuple, may be deployed or executed on a computing device. For example, a computing device of a plurality of computing devices may deploy and/or execute one or more processing elements. Each processing element may be capable and/or configured to process a received data load. As used herein, the terms "stream operator" and "processing element" may be used interchangeably.

In some embodiments, a computing device, such as computing device 12, may include and/or execute any number of processing elements capable and/or configured to process the received data load. Further, processing elements may be inserted or removed dynamically from a streams graph representing the flow of data through the stream computing application. A particular stream operator may not reside within the same operating system process as other stream operators. In addition, stream operators in the same streams graph may be deployed on different computing devices of a plurality of computing devices or on different cores of a computing device.

In some embodiments, a data load in the context of stream computing may flow from one stream operator to another in the form of a "tuple." In some embodiments, a tuple may be a sequence of one or more attributes associated with an entity. Attributes may be any of a variety of different types, (e.g., integer, float, Boolean, string, etc.) In some embodiments, the attributes may be ordered. In addition to attributes associated with an entity, a tuple may include metadata, (i.e., data about the tuple). A tuple may be extended by adding one or more additional attributes or metadata to it. As used herein, "stream" or "data stream" may refer to a sequence of tuples. In some embodiments, a "stream" may be considered a pseudo-infinite sequence of tuples.

In some embodiments, an output tuple may be changed (e.g., relative to an input tuple) in some way by a stream operator. An attribute or metadata may be added, deleted, or modified. For example, a tuple may have two or more attributes. A stream operator may receive the tuple having multiple attributes and output a tuple corresponding with the input tuple. In one example, the stream operator may change one of the attributes so that all of the attributes of the output tuple except one are the same as the attributes of the input tuple. However, any number of changes may be made to the input tuple such that the output tuple includes the changes made to the input tuple.

In some embodiments, an input tuple may be received at a stream operator and may be processed through one or more logical operations (e.g., one or more stream operators). Each logical operation (e.g., stream operator) may be capable of being deployed by itself on a computing device or in conjunction with a peer logical operator. In addition, multiple stream operators may be deployed on a single computing device. In some embodiments, these logical operations may be deployed as Linux processes with TCP connections to their peers. However, other processes (i.e., non-Linux) and other connections between stream operators are within the scope of the present disclosure.

In some embodiments, a streams graph may include a connected graph of processes or operations that the data load may progress through. However, when deployed, due to network/processing/volume and/or other constraints, overflow activation process 10 may include parallelizing one or more sections of the streams graph to avoid congestion via one or more potential overflow paths. However, not all potential overflow paths or parallel routes may have equal efficiency. For example, there may be a primary route or original path for all data. The original path may be selected as the path with the best transmission characteristics. These transmission characteristics may include, but are not limited to, a lowest or best end-to-end latency relative to other parallel routes through the plurality of computing devices. In some embodiments, these other non-primary routes may have a higher end-to-end latency or otherwise may have worse transmission characteristics. In some embodiments, and as will be explained in greater detail below, a data load or stream of tuples may be streamed through the original route until the efficiency of utilizing one or more overflow paths or parallel routes becomes equal to streaming the data load through the original route, at which point stream traffic may be split, or parallelized, as to maintain performance parity.

However, and as will be discussed in greater detail below, one or more potential overflow paths or parallel routes may not exist or may not be known for streaming data at the time a stream application is compiled and/or during processing of the streaming application. For example, potential overflow paths may not have been defined due to previously not having experienced congestion on the original path. In some embodiments of the present disclosure, overflow activation process 10 may define one or more potential overflow paths and a manner in which the one or more potential overflow paths may be pro-actively/dynamically deployed and/or activated to minimize overall system latency.

In some embodiments, overflow activation process 10 may include sampling 324 one or more system state variables of each computing device of the plurality of computing devices during run time of one or more streaming processing applications. For example, the sampling of the one or more system state variables may include, but are not limited to, one or more of CPU capability, memory capability, disk utilization, I/O capability, and virtual memory capability. In some embodiments, overflow activation process 10 may communicate with and/or may be incorporated into a Streaming Application Manager (SAM). In some embodiments, overflow activation process 10 may include an embedded optimization engine for sampling the one or more system state variables of each computing device of the plurality of computing devices during run time of one or more streaming applications. In some embodiments, overflow activation process 10 may access an optimization engine embedded within the Streaming Application Manager (SAM).

Figure 4:
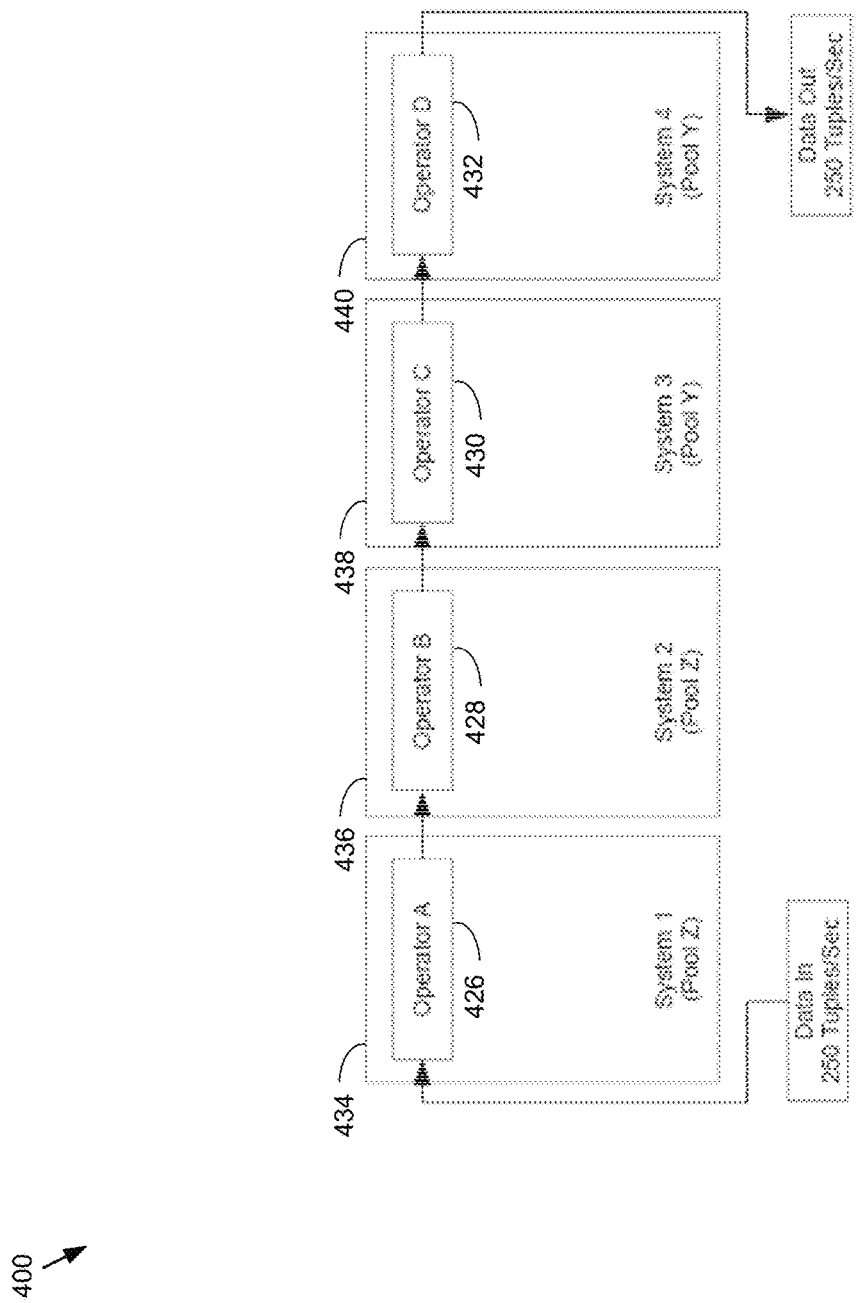
FIG. 4 is an example diagrammatic view of a streams graph according to one or more example implementations of the disclosure.

Referring also to FIG. 4, and as will be described in greater detail below, a streams graph 400 may include a plurality of stream operators or logical operations, 426, 426, 428, 430. In some embodiments, the plurality of stream operators 426, 426, 428, 430 may also be referred to Operator A 426, Operator B 428, Operator C 430, and Operator D 432, respectively. In some embodiments, and as discussed above, Operator A 426 may be a stream operator or processing element deployed on a computing device. For example, Operator A 426 may be deployed on System 1 434, Operator B 428 may be deployed on System 2 436, Operator C 430 may deployed on System 3 438, and Operator D 432 may be deployed on System 4 440. Overflow activation process 10 may include sampling the one or more system state variables of System 1 434, System 2 436, System 3 438, and/or System 4 440 for one or more system state variables such as CPU processing capability (CPU), memory capability or capacity, disk utilization, I/O capability and/or virtual memory capability or capacity. In one example, overflow activation process 10 may sample or collect the following metrics:

System 1 State Variables: 3 CPU, 14 GB RAM, 1 Gb/s Network

System 2 State Variables: 1.5 CPU, 2 GB RAM, 1 Gb/s Network

System 3 State Variables: 5 CPU, 8 GB RAM, 1 Gb/s Network

System 4 State Variables: 4 CPU, 8 GB RAM, 1 Gb/s Network

In some embodiments, overflow activation process 10 may include generating 326 one or more best fit models for application patterns. A best fit model as used herein may include, but is not limited to, a model including the original path and one or more potential overflow paths that is able to efficiently stream the data load based upon, at least in part, the application patterns. An application pattern as used herein may include, but is not limited to, a pattern of access and/or use of a stream application by the plurality of computing devices. In some embodiments, an application pattern may, in a generalized form, also include items such as regular system maintenance, periodic operations unrelated to the streaming (overnight backups), and other regularly occurring activity on the systems that host the streaming application.

In some embodiments, overflow activation process 10 may include monitoring one or more stream applications to determine the application pattern(s). The one or more best fit models may be based upon, at least in part, the sampled system state variables of each computing device. Additionally and/or alternatively, overflow activation process 10 may profile each stream operator based on the same metrics or state variables. For example, overflow activation process 10 may determine one or more of how much processing power each stream operator needs and/or uses, how much memory each stream operator needs and/or uses, how connected is each stream operator to its neighbor, how much latency is there between each stream operator, etc.

Overflow activation process 10 may include configuring the one or more best fit models for duplicating stream operators or processing elements. Additionally and/or alternatively, the one or more best fit models may be configured for creating and removing dynamic connections. In some embodiments, the one or more best fit models may be configured for optimizing graph flows. Graph flows as used herein may include but is not limited to, the flow or stream of the data load or tuples through the plurality of computing devices defined in a streams graph. In other words, overflow activation process 10 may generate or configure the one or more best fit models by modeling potential processing elements, creating or removing dynamic connections, and/or optimizing the flow or stream of tuples through the plurality of computing devices by creating or removing connections to new or existing processing elements of the plurality of computing devices. Overflow activation process 10 may iteratively generate the one or more best fit models to optimize the graph flow or stream of tuples through the streams graph. In some embodiments, and as will be discussed in greater detail below, overflow activation process 10 may generate the one or more best fit models prior to the implementation or deployment of a streaming application and/or during the implementation or deployment of the streaming application. In some embodiments, and as will be discussed in greater detail below, overflow activation process 10 may generate the one or more best fit models prior to the implementation or deployment of a streaming application (e.g., compile time) and/or during the implementation or deployment of the streaming application (e.g., regularly generated and/or updated at runtime).

Figure 7:
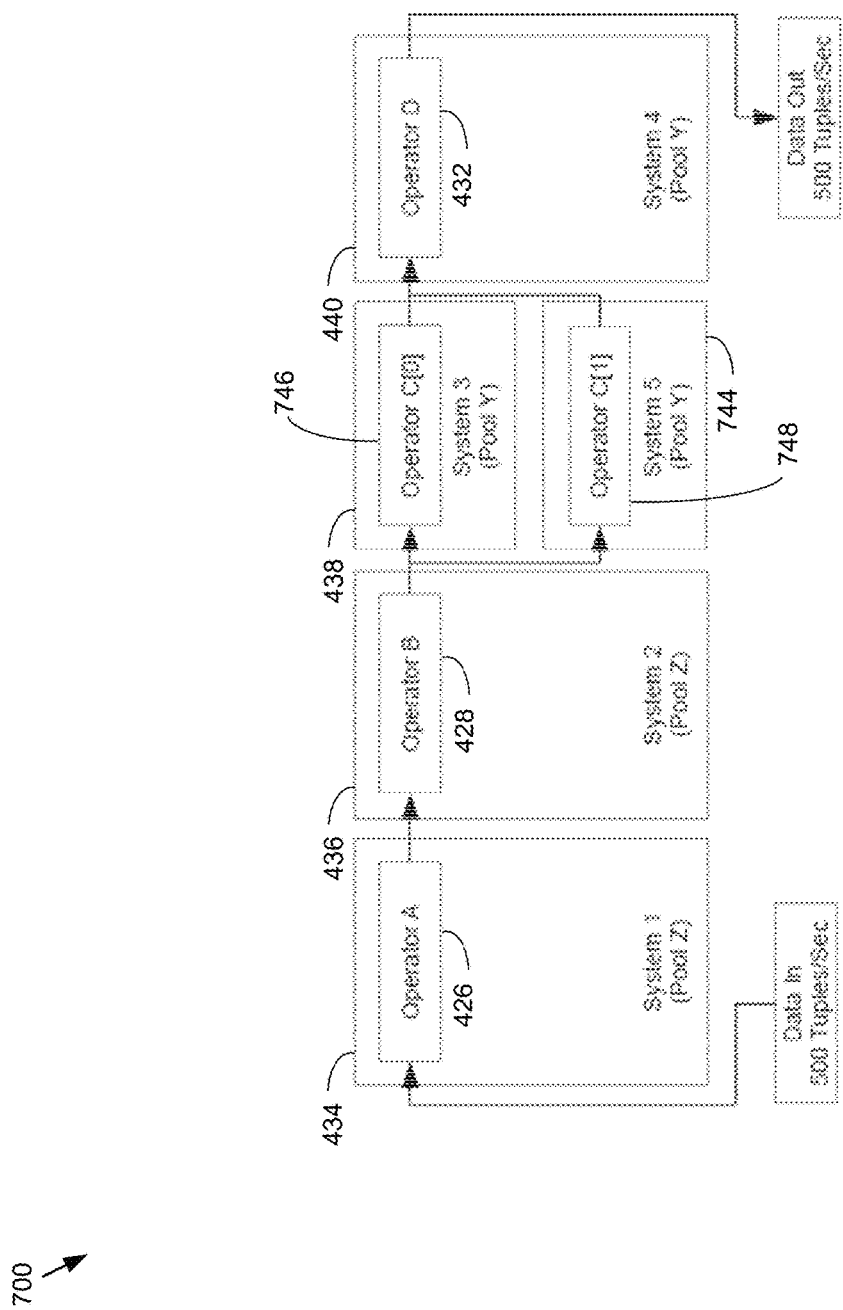
FIG. 7 is an example diagrammatic view of a streams graph according to one or more example implementations of the disclosure.

For example, and referring also to FIGS. 4 and 7, overflow activation process 10 may define 316 one or more potential overflow paths for processing at least a portion of the data load through a plurality of stream operators deployed on a plurality of computing devices. For example, an exemplary streaming application may be written such that there are multiple processing steps (e.g., steps A-D). A logical graph or streams graph may be written as A→B→C→D or may be represented as illustrated in FIG. 4. Overflow activation process 10 may generate one or more best fit models for a stream application based upon a pattern of access and use of the stream application. In the example of FIG. 4, the streaming application may be implemented by a plurality of stream operators (Operator A 426, Operator B 428, Operator C 430, and Operator D 432) deployed on a plurality of computing devices (System 1 434, System 2 436, System 3 438, and System 4 440) where these four systems may always be present and may be available at select hours (shared with another processing job). In some embodiments, overflow activation process may generate a best fit model by duplicating one or more stream operators (Operator A 426, Operator B 428, Operator C 430, and Operator D 432) deployed on a plurality of computing devices (System 1 434, System 2 436, System 3 438, and System 4 440) to create System 5 744. Overflow activation process 10 may create dynamic connections between Operator A 426 and Operator B 428, Operator B 428 and Operator C[0] 746, and between Operator C[1] 748 and Operator D 432. In this example, overflow activation process 10 may implement the streaming application such that each stream operator is on an isolated system; Operator A 426 deployed on System 1 434, Operator B 428 deployed on System 2 436, etc. However, other configurations utilizing a single system for multiple stream operators or apportioning a stream Operator A 426 across multiple systems are within the scope of this disclosure.

In some embodiments, defining the one or more potential overflow paths for processing at least a portion of the data load through a plurality of stream operators deployed on a plurality of computing devices may also include defining an original path for processing at least a portion of the data load through a plurality of stream operators deployed on the plurality of computing devices. As discussed above, the original path may be a default or primary path chosen from one or more potential paths through the streams graph. For example, generating the one or more best fit models may define multiple potential paths through the streams graph. Overflow activation process 10 may identify a default or original path for processing at least a portion of the data load through the plurality of stream operators deployed on the plurality of computing devices based upon, at least in part, an end-to-end latency defined for the plurality of computing devices. In some embodiments, overflow activation process 10 may identify an original path for processing the data load that maximizes throughput and/or capacity.

In another example, as shown in FIG. 7, overflow activation process may generate 342 a best fit model by duplicating a plurality of stream operators (Operator A 426, Operator B 428, Operator C[0] 746, Operator C[1] 748, and Operator D 432) deployed on a plurality of computing devices (System 1 434, System 2 436, System 3 438, and System 4 440) and creating dynamic connections between Operator A 426 and Operator B 428, between Operator B 428 and Operator C[0] 746, between Operator B 428 and Operator C[1] 748, between Operator C[0] 746 and Operator D 432, and between Operator C[1] 748 and Operator D 432. Utilizing two versions of Operator C, (e.g., Operator C[0] 746 and Operator C[1] 748), may be referred to as parallelism. However, since overflow activation process 10 may not always have access to Operator C[1] 748, a profiling mode of the compiler 64 and/or best fit model may not model Operator C[1] 748 or create dynamic connections between Operator [B], Operator C[1] 748, and/or Operator D 432. In this example, because Operator C[1] 748 may not always be available and therefore may not be utilized, the performance of the streaming application may be impaired.

Figure 6:
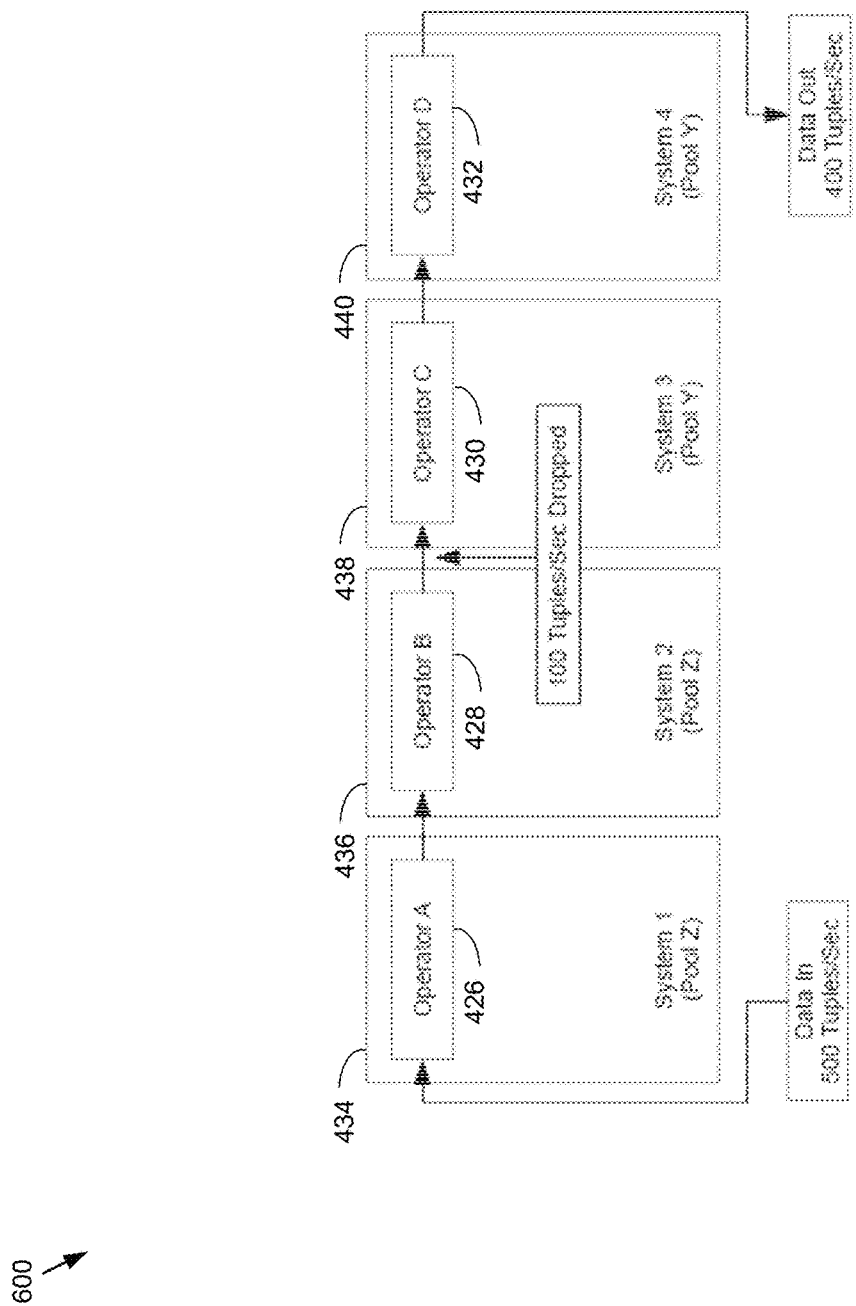
FIG. 6 is an example diagrammatic view of a streams graph according to one or more example implementations of the disclosure.

For example, and referring also to FIG. 6, with an increase in the data load flow rate, (e.g., 500 tuples per second or "tuples/second") and without the ability to create dynamic connections to Operator C[1] 748, because Operator C[1] 748 may not always be available, a portion of the data load may be dropped (e.g., 100 tuples/second dropped). In this example, overflow activation process 10 may monitor this data load flow rate increase and generate one or more revised best fit models during the next compiling of the stream application. However, and as will be discussed in greater detail below, such a configuration may impair the performance of the streaming application at run-time when hardware changes and/or when data load flow rate changes based on the availability or use of computing devices and/or processing elements. Further, such monitoring may require canceling the stream application, re-compiling the stream application, and/or re-monitoring the stream application until a preferred solution is defined.

In some embodiments, overflow activation process 10 may include determining 318 a conditional availability for each computing device of the plurality of computing devices. Returning again to the example of FIG. 6, a profiling mode of the compiler 64 may not be able to and/or may not be configurable to determine future availability for computing devices and/or processing elements once compiled. In some embodiments, overflow activation process 10 may manage transient resources where one or more dynamic overflow paths may be required and the conditional availability of the plurality of computing devices may impact the scheduling of a path for tuple processing. When creating multiple overflow paths, overflow activation process 10 may define the conditional availability of each of the one or more potential overflow paths over time (by determining the conditional availability of the plurality of computing devices), the negative impact when any given overflow path is removed due to resource constraints, and/or how to minimize the tuple processing delay.

In some embodiments, the conditional availability for each computing device of the plurality of computing devices may be based upon, at least in part, scheduled maintenance, scheduled activity or resource allocation on each computing device to other applications and/or users, the lifespan of physical components associated with each computing device (e.g., hard drive life time, motherboard life time), etc. For example, overflow activation process 10 may determine that three of eight critical components associated with a computing device are reaching the end of their projected life time and that maintenance may be needed soon. Accordingly, overflow activation process 10 may modify the one or more best fit models to put fewer resources on the computing device as this computing device may be taken down shortly.

For example, and referring also to FIG. 7, overflow activation process 10 may determine the conditional availability of the plurality of computing devices (e.g., System 1 434, System 2 436, System 3 438, System 4 440, and/or System 5 744). For example, overflow activation process 10 may determine that Systems 1-2 and 4 are always available/ are always capable of processing a data load at a flow rate of 500 tuples/second. However, in this example, overflow activation process 10 may determine that System 3 438, while always available, may only be able to process a data load at a flow rate of 400 tuples/second. Additionally, overflow activation process 10 may determine that System 5 744 is available during one or more periods of time and/or is capable of processing a data load at a flow rate of 400 tuples/second. In some embodiments, overflow activation process 10 may determine the conditional availability of resources of the plurality of computing devices. In another example, System 3 438 may always be available and may have the capacity to process a data load at a flow rate of 500 tuples/second. However, during one or more periods during the day, System 3 438 may share processing capacity with other users and/or other applications which may reduce System 3's 438 capacity to process a data load during those times to 400 tuples/second. As such, overflow activation process 10 may determine that System 3 438 has a conditional availability for processing 400 tuples/second during a first period of time and 500 tuples/second during a second period of time (e.g., System 3 438 is slower from midnight to 3 A.M. because of backups). Overflow activation process 10 may determine the conditional availability of each of the plurality of computing devices. While two "periods of time" have been discussed, any number of periods of time (e.g., seconds, minutes, hours, days, weeks, months, years, etc.) may be determined for the conditional availability of a computing device.

Additionally and/or alternatively, overflow activation process 10 may include the cost of deploying the plurality of stream operators on the plurality of computing devices when determining the conditional availability of the plurality of computing devices. For example, certain computing devices may have various performance advantages over other computing devices. However, deploying stream operators on these higher-performance computing devices may increase the cost of executing the stream application. Additionally, certain computing devices may have various performance disadvantages compared to other computing devices. However, deploying stream operators on these lower-performance computing devices may decrease the cost of executing the stream application. While cost has been discussed, overflow activation process 10 may consider other factors when determining the conditional availability of the plurality of computing devices and/or when generating the one or more best fit models.

Additionally and/or alternatively, overflow activation process 10 may include networking availability of the plurality of computing devices when determining the conditional availability of the plurality of computing devices. For example, cloud data centers may be bonded to the backbone of the internet. In some instances, backbone providers may bill a user of the data center based upon whether more data is sent or received. Typically, a user may pay for a traffic imbalance between the data transmitted and the data received. Based on these costs and an identified traffic imbalance during a period of time, overflow activation process 10 may determine the conditional availability of the plurality of computing devices to minimize these costs and latency while maximizing preferential availability for one or more computing devices.

In some embodiments, overflow activation process 10 may define the one or more potential overflow paths for processing at least a portion of the data load through a plurality of stream operators deployed on the plurality of computing devices based upon the conditional availability of each of the plurality of computing devices. In some embodiments, overflow activation process 10 may incorporate the conditional availability of the plurality of computing devices into the one or more best fit models. Referring again to the example of FIGS. 4, 5 and 7 and as will be discussed in greater detail below, overflow activation process 10 may determine, through one or more best fit models and the conditional availability of the plurality of computing devices, that an original path (e.g., via Operator A 426 deployed on System 1 434, Operator B 428 deployed on System 2 436, Operator C 430 deployed on System 3 438, and/or Operator D 432 deployed on System 4 440) may provide the maximum throughput when the data load flow rate is less than 500 tuples/second. Additionally, overflow activation process 10 may determine that the original path may provide the maximum throughput during a certain period of the time when System 3 438 is capable of processing a maximum of 500 tuples/second. Additionally and/or alternatively, overflow activation process 10 may determine that the original path may provide the maximum throughput during a certain period of time when System 3 438 is capable of processing a maximum of 500 tuples/second and the data load flow rate is less than 500 tuples/second. Additionally and/or alternatively, overflow activation process 10 may determine that a first overflow path (e.g., via Operator A 426 deployed on System 1 434, Operator B 428 deployed on System 2 436, Operator C[0] 746 deployed on System 3 438, Operator C[1] 748 deployed on System 5 744 and/or Operator D 432 deployed on System 4 440) may provide the maximum throughput during a certain period of the day when System 3 438 is capable of processing a maximum of 500 tuples/second and the data load flow rate is greater than or equal to 500 tuples/second. While a first potential overflow path has been described above, any number of potential overflow paths are within the scope of the present disclosure.

Figure 5:
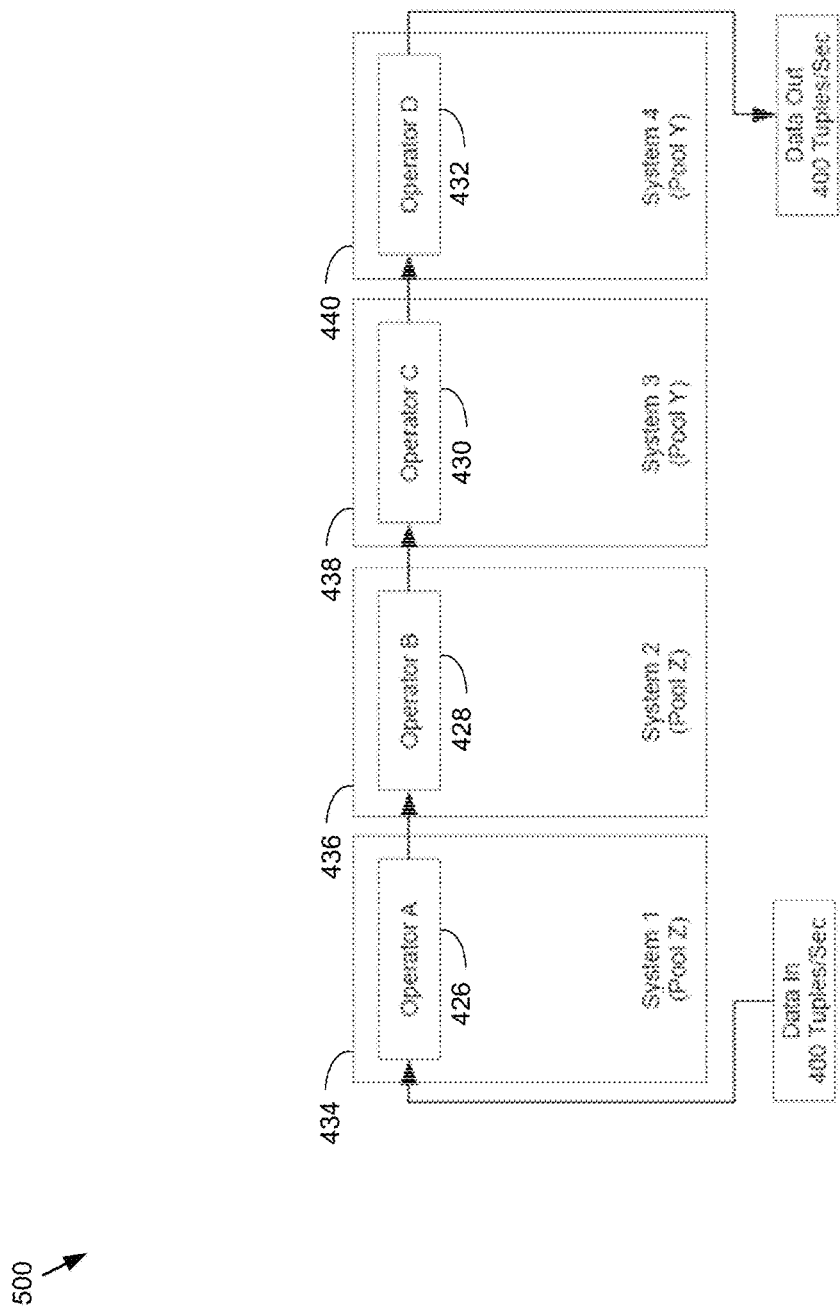
FIG. 5 is an example diagrammatic view of a streams graph according to one or more example implementations of the disclosure.

In some embodiments, overflow activation process 10 may also include identifying 320 a change in one or more of a configuration of the plurality of computing devices and the at least a portion of the data load. Referring also to the examples of FIGS. 4 and 5, overflow activation process 10 may identify a change in the data load (e.g., flow rate of data load increase from 250 tuples/second to 400 tuples/second). Prior to the identified change, overflow activation process 10 may sample or collect the following metrics for the data load flow rate of 250 tuples/second:

System 1 434 State Variables: 3 CPU, 14 GB RAM, 1 Gb/s Network
System 2 436 State Variables: 1.5 CPU, 2 GB RAM, 1 Gb/s Network
System 3 438 State Variables: 5 CPU, 8 GB RAM, 1 Gb/s Network
System 4 440 State Variables: 4 CPU, 8 GB RAM, 1 Gb/s Network In the example of FIG. 5, overflow activation process 10 may identify a change in the data load flow rate from 250 tuples/second to 400 tuples/second. Upon identifying a change in the data load, overflow activation process 10 may sample or collect the following metrics for the data flow rate of 400 tuples/second:

System 1 State Variables: 4.8 CPU, 22.4 GB RAM, 1.6 Gb/s Network
System 2 State Variables: 2.4 CPU, 3.2 GB RAM, 1.6 Gb/s Network
System 3 State Variables: 8 CPU, 12.8 GB RAM, 1.6 Gb/s Network
System 4 State Variables: 6.4 CPU, 12.8 GB RAM, 1.6 Gb/s Network As can be seen from the above example system state variable, the resource consumption has grown at a linear rate. This may be an oversimplification of actual metrics that may be collected and is provided for explanation purposes only. Assume for example purposes only that the capacity of each system is as follows:

System 1 Capacity: 16 CPU, 64 GB RAM, 2 Gb/s Network
System 2 Capacity: 16 CPU, 64 GB RAM, 2 Gb/s Network
System 3 Capacity: 8 CPU, 32 GB RAM, 10 Gb/s Network
System 4 Capacity: 8 CPU, 32 GB RAM, 10 Gb/s Network In this example, the original path may still provide the maximum throughput and/or capacity. In other words, Operators A-D deployed on Systems 1-4 may be capable of withstanding the increase in resource consumption resulting from the identified change in the data load flow rate from 250 tuples/second to 400 tuples/second. However, if the data flow rate increases and/or the system capacity of one or more of Systems 1-4 changes, the original path may no longer be able to provide the maximum throughput and/or capacity.

Referring also to FIGS. 6 and 7, overflow activation process 10 may include dynamically activating 322 one or more potential overflow paths in response to the identified change based upon, at least in part, the conditional availability for each computing device of the plurality of computing devices. In the example of FIG. 6, overflow activation process 10 may identify a change in the data load flow rate from 400 tuples/second to 500 tuples/second. Upon identifying a change in the data load, overflow activation process 10 may determine the following projected metrics for the data flow rate of 500 tuples/second:

System 1: 6 CPU, 28 GB RAM, 2 Gb/s Network
System 2: 3 CPU, 4 GB RAM, 2 Gb/s Network
System 3: 10 CPU, 16 GB RAM, 2 Gb/s Network
System 4: 8 CPU, 16 GB RAM, 2 Gb/s Network In this example, the original path (shown in FIG. 5) may not be capable of withstanding the increase in resource consumption resulting from the identified change in the data load flow rate from 400 tuples/second to 500 tuples/second. Specifically, Operator C 430 deployed on System 3 438, with a maximum CPU capacity of 8 CPU, may require 10 CPU to process the increased data load flow rate of 500 tuples/second. As discussed above, the capacity of System 3 438 may be based upon, at least in part, the conditional availability of System 3 438. In response, overflow activation process 10 may dynamically activate one or more potential overflow paths in response to the identified change based upon, at least in part, the conditional availability for each computing device of the plurality of computing devices. Referring to FIG. 7 and as discussed above, overflow activation process 10 may determine that System 5 744 is conditionally available for parallelization at the time of the identified change in the data load flow rate by deploying Operator C[1] 748 on System 5 744 and Operator C[0] 746 on System 3 438.

Figure 8:
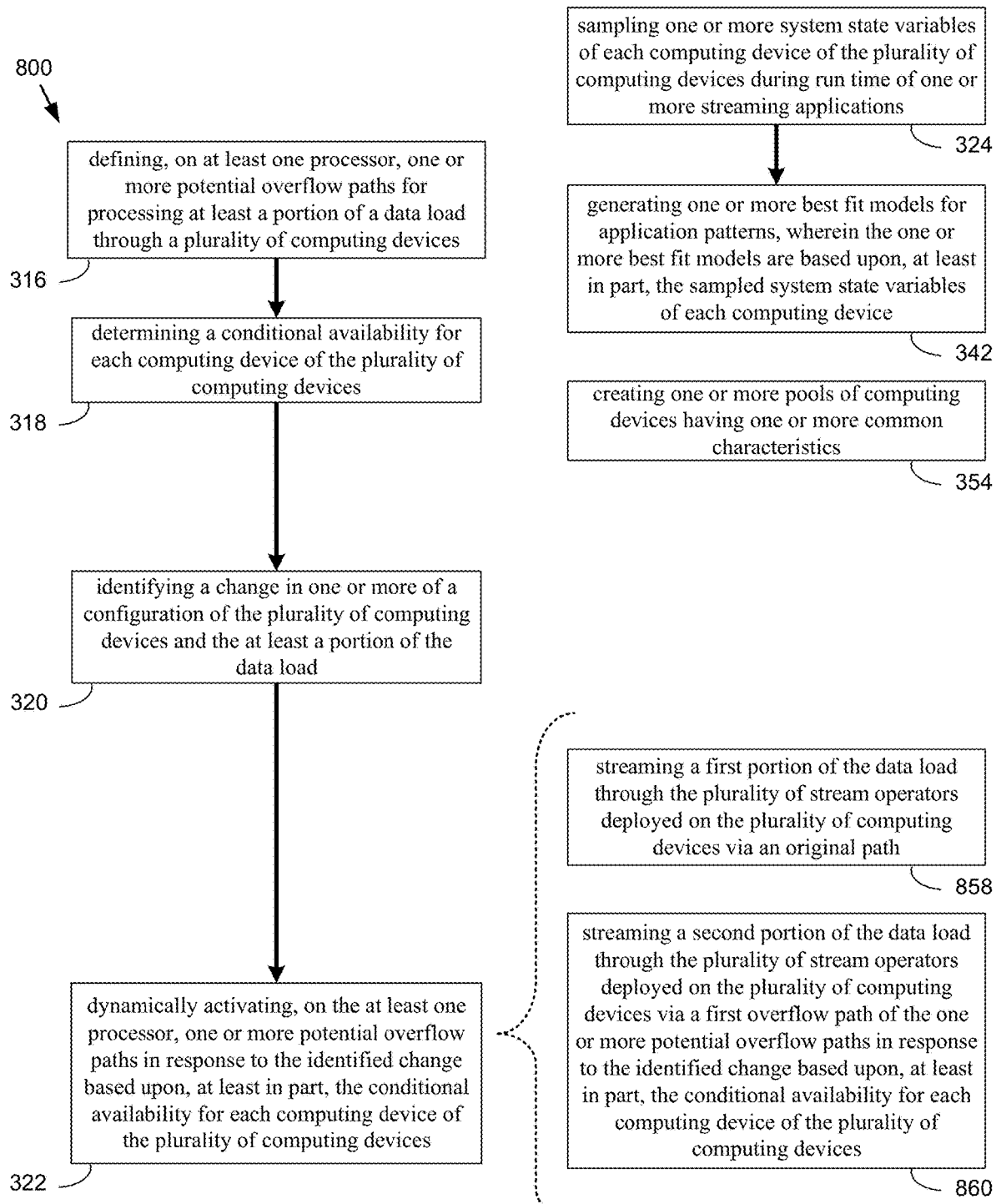
FIG. 8 is an example flowchart of the overflow activation process of FIG. 1 according to one or more example implementations of the disclosure.

Referring also to FIG. 8, in some embodiments, dynamically activating one or more potential overflow paths may include streaming a first portion 858 of the data load through the plurality of stream operators deployed on the plurality of computing devices via an original path and streaming a second portion 860 of the data load through the plurality of stream operators deployed on the plurality of computing devices via a first overflow path of the one or more potential overflow paths in response to the identified change based upon, at least in part, the conditional availability for each computing device of the plurality of computing devices. In the above example of FIG. 7, overflow activation process 10 may stream a first portion of the data load through the original path (e.g., via Operators A, B, C[0], and D) and a second portion of the data load through the first overflow path (e.g., via Operators A, B, C[1], and D).

In some embodiments, the data load may be divided between the original path and the first overflow path. For example, overflow activation process 10 may direct Operator B 428 to split the data load by allocating any number of tuples to each of the original path and the first overflow path. For example, overflow activation process 10 may push a configuration to Operator B 428 to split the data load (based on a one second window) into a first portion of 400 tuples to be sent to Operator C[0] 746 and any tuples in excess of 400 to Operator C[1] 748.

However, in some embodiments, overflow activation process 10 may stream a first portion of the data load through the plurality of stream operators deployed on the plurality of computing devices via a first potential overflow path and streaming a second portion of the data load through the plurality of stream operators deployed on the plurality of computing devices via a second overflow path. In other words, overflow activation process 10 need not be bound to stream a portion of the data load via the original path in response to a change in the data load and/or in the configuration of the plurality of computing devices.

In some embodiments, overflow activation process 10 may dynamically activate one or more potential overflow paths in response to the identified change based upon, at least in part, the conditional availability for each computing device of the plurality of computing devices and tuple rate window load balancing. In some embodiments, tuple rate window balancing or "windowing" may be a feature a developer can use in a stream application. Referring again to the example of FIG. 7, it may take 30 milliseconds to process a tuple through Operator C[0] 746 and 40 millisecond to process a tuple through Operator C[1] 748. However, Operator D 432 may process data every 10 milliseconds. As a result, the data received from Operator C[0] 746 may be not be synchronized with the data received from Operator C[1] 748. Overflow activation process 10 may dynamically activate the one or more potential flow paths based upon the tuple rate window balancing constraints of Operator D 432 to ensure that data from Operators C[0] and C[1] arrive at Operator D 432 in a relatively correct order.

In some embodiments, identifying a change in one or more of the configuration of the plurality of computing devices and the at least a portion of the data load may include predicting 350 a change in one or more of the configuration of the plurality of computing devices and the at least a portion of the data load based upon, at least in part, the conditional availability for each computing device of the plurality of computing devices. Referring again to FIGS. 4, 5, and 7, overflow activation process 10 may predict a change in one or more of the configuration of the plurality of computing devices and the data load based upon, at least in part, the conditional availability for each computing device. For example, overflow activation process 10 may determine that System 3 438 is only available for processing a data load at a maximum flow rate of 400 tuples/second during a first period of time. However, during a second period of time, System 3 438 may be available for processing a data load at a maximum flow rate of 500 tuples/second.

In some embodiments, overflow activation process 10 may use predictive connection establishment and splitting of connections based on historical trends related to the conditional availability of the plurality of computing devices to generate the one or more best fit models. For example, overflow activation process may include incorporating historical learned state of systems (e.g., System 3 438 is always slower at midnight to 3 AM because of backups, etc.) into the best fit models to determine one or more dynamic overflow paths in response to a predicted change in the configuration of the plurality of computing devices and/or the data load.

Additionally and/or alternatively, overflow activation process 10 may predict a change in one or more of the configuration of the plurality of computing devices and the data load based upon, at least in part, the application pattern. As discussed above, the application pattern may include a pattern of access and/or use of a stream application. For example, consider an exemplary video streaming service with an non-uniform traffic distribution. Viewership of the video streaming service may peak (e.g., 1000 tuples/second) in the evening (e.g., between 6 P.M. and 11 P.M.) but may be fairly idle (e.g., 250 tuples/second) during the rest of the day. While the video streaming service may always be available, it may be desirable to scale the capacity of the streams graph (e.g., through one or more computing devices such as servers, networks, etc.) down during the day and up during the evening. Overflow activation process 10 may seamlessly adjust capacity during operation without interruption by dynamically activating one or more potential overflow paths in response to the predicted change based upon, at least in part, the conditional availability for each computing device of the plurality of computing devices.

In some embodiments, dynamically activating 352 one or more potential overflow paths in response to the identified change may include dynamically activating one or more potential overflow paths in response to the predicted change based upon, at least in part, the conditional availability for each computing device of the plurality of computing devices. For example and referring to the example of FIG. 5, with historical metrics (e.g., application pattern) overflow activation process 10 may predict that traffic (e.g., the data load flow rate) will soon increase from 400 tuples/second to 500 tuples/second. Additionally and/or alternatively, overflow activation process 10 may predict the unavailability of sufficient resources on one or more computing devices based upon the conditional availability for each computing device of the plurality of computing devices. Overflow activation process 10 may take current metrics and speculatively plan to increase the capacity of every operator in place. As discussed above, with an increase from 400 tuples/second to 500 tuples/second, Operator C 430 may not "fit" on System 3 438. In this example and as discussed above, overflow activation process 10 may relocate or parallelize Operator C 430 onto one or more additional computing devices.

In some embodiments, overflow activation process 10 may include creating 354 one or more pools of computing devices having one or more common characteristics. In some embodiments, the one or more common characteristics may include processing power, memory, uptime, reliability, etc. Referring to the example of FIG. 4, Operator A 426 and Operator B 428 may both use systems from Pool Z. Pool Z may include computing devices with one or more common characteristics. Additionally and/or alternatively, Operator C 430 and Operator D 432 may both use systems from Pool Y. In some embodiments, each operator may have a preferred set of characteristics that may determine which system or systems to use for processing that operator. For example, Operator C 430 may prefer to be used or processed on systems from Pool Y (or systems with the same characteristics as those of Pool Y). In the example of FIG. 4, the computing devices from Pools Y & Z may have the following common characteristics:

Pool Y: 8 CPU, 32 GB RAM, 10 Gb/s Network
Pool Z: 16 CPU, 64 GB RAM, 2 Gb/s Network In some embodiments, overflow activation process 10 may include dynamically interchanging 356 one or more computing devices included in at least one of the potential overflow paths with one or more computing devices from the same pool of the one or more pools of computing devices in response to the identified change based upon, at least in part, the conditional availability for each computing device of the plurality of computing devices. In some embodiments, overflow activation process 10 may include using pools of machines with similar characteristics to decide appropriate splitting of processing elements and connections. Overflow activation process 10 may include dynamic or automatic adjustment of computing devices involved in a connection if and/or when that computing device becomes unavailable. In this example, a stream operator may be relocated to another computing device in the pool and the connection may be re-established. While overflow activation process 10 may include redeploying a stream operator from one computing device to another computing device from the same pool, any computing device, including those from different pools with different characteristics, may be used for deploying a stream operator.

In another embodiment, overflow activation process 10 may include ranking each computing device in each pool for usage with each stream operator. For example, Operator A 426 may require high CPU utilization. Overflow activation process 10 may rank each computing device in each pool for Operator A 426 based upon the computing devices with the highest CPU capacity based upon the conditional availability of each computing device.

Returning to the example of FIG. 7 where overflow activation process 10 may predict that the data load flow rate may increase from 400 tuples/second to 500 tuples/second, overflow activation process 10 may dynamically interchange System 3 438 with another computing device. In one example, overflow activation process 10 may identify potential Pool Z systems which could grow Operator C's single system processing capacity by moving it from System 3 438 of Pool Y to a Pool Z system. However, at 500 tuples/second, a Pool Z system operating at 500 tuples/second may reach its maximum network capacity of 2 Gb/s. In this example, if overflow activation process 10 determines any historical evidence of a data load flow rate above 500 tuples/second, overflow activation process 10 may consider parallelization because the configuration would likely require parallelization if and when the data load flow rate increases above 500 tuples/second. As discussed above, parallelization may allow Operator C 430 to remain on one or more Pool Y systems, which may be the preference of Operator C. In the above example, overflow activation process 10 may select System 5 744 from Pool Y to parallelize Operator C.

In some embodiments, overflow activation process 10 may identify a change in the configuration of the plurality of computing devices. In the example of FIG. 5, System 3 438 may become entirely unavailable or unavailable to process the entire data load at the current flow rate (e.g., 500 tuples/second). Overflow activation process 10 may dynamically interchange System 3 438 with one or more of System 6 (not shown) and/or System 7 (not shown) in response to the identified change based upon the conditional availability of the plurality of computing devices (e.g., the conditional availability of Systems 3, 6, and/or 7). In some embodiments, overflow activation process 10 may predict a change in the configuration of the plurality of computing devices and/or a change in at least a portion of the data load based upon, at least in part, the conditional availability for each computing device of the plurality of computing devices. In another example, overflow activation process may predict the increase in the data load flow rate and/or the unavailability of System 3 438. In this example, overflow activation process 10 may dynamically interchange System 3 438 with one or more of System 6 (not shown) and/or System 7 (not shown) in response to the predicted change based upon the conditional availability of the plurality of computing devices (e.g., the conditional availability of Systems 3, 6, and/or 7).

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:
1. A computer-implemented method comprising:
defining, on at least one processor, one or more potential overflow paths for processing at least a portion of a data load through a plurality of stream operators deployed on a plurality of computing devices, wherein each stream operator of the plurality of stream operators is configured to perform one or more logical operations on the at least a portion of the data load as the at least a portion of the data load passes from one stream operator to a next stream operator in the one or more potential flow paths;
determining, on the at least one processor, a conditional availability for each computing device of the plurality of computing devices;
identifying, on the at least one processor, a change in one or more of a configuration of the plurality of computing devices and the at least a portion of the data load;

predicting, on at least one processor, a future change in one or more of the configuration of the plurality of computing devices and the at least a portion of the data load based upon, at least in part, the conditional availability for each computing device of the plurality of computing devices and observed historical application patterns;

dynamically activating, on the at least one processor, one or more potential overflow paths in response to the identified change based upon, at least in part, the conditional availability for each computing device of the plurality of computing devices and a tuple rate load balancing, the tuple rate load balancing designating an order of the data load, wherein the one or more potential overflow paths includes at least one duplicate stream operator based on the plurality of stream operators; and dynamically activating, on the at least one processor, the one or more potential overflow paths in anticipation of the predicted future change, wherein the one or more potential overflow paths includes the at least one duplicate stream operator based on the plurality of stream operators, and wherein dynamically activating the one or more potential overflow paths in anticipation of the predicted future change includes creating dynamic connections to the at least one duplicate stream operator.

2. The computer-implemented method of claim 1, wherein dynamically activating one or more potential overflow paths includes:

streaming a first portion of the data load through the plurality of stream operators deployed on the plurality of computing devices via an original path; and streaming a second portion of the data load through the plurality of stream operators deployed on the plurality of computing devices via a first overflow path of the one or more potential overflow paths in response to the identified change based upon, at least in part, the conditional availability for each computing device of the plurality of computing devices, wherein the data load is divided between the original path and the first overflow path.

3. The computer-implemented method of claim 1, further comprising:

sampling one or more system state variables of each computing device of the plurality of computing devices during run time of one or more streaming applications, wherein the one or more sampled system state variables include one or more of CPU capability, memory capability, disk utilization, I/O capability, and virtual memory capability.

4. The computer-implemented method of claim 3, further comprising:

generating one or more best fit models for application patterns based upon, at least in part, the sampled system state variables of each computing device, wherein the one or more best fit models are configured for one or more of duplicating stream operators, creating and removing dynamic connections, and optimizing graph flows.

5. The computer-implemented method of claim 1, wherein dynamically activating one or more potential overflow paths in response to the identified change includes dynamically activating one or more potential overflow paths in response to the predicted change based upon, at least in part, the conditional availability for each computing device of the plurality of computing devices.

6. The computer-implemented method of claim 1, further comprising:

creating one or more pools of computing devices having one or more common characteristics; and dynamically interchanging one or more computing devices included in at least one of the potential overflow paths with one or more computing devices from the same pool of the one or more pools of computing devices in response to the identified change based upon, at least in part, the conditional availability for each computing device of the plurality of computing devices.

7. A computer program product comprising a non-transitory computer readable storage medium having a plurality of instructions stored thereon, which, when executed by a processor, cause the processor to perform operations including:

defining one or more potential overflow paths for processing at least a portion of a data load through a plurality of stream operators deployed on a plurality of computing devices, wherein each stream operator of the plurality of stream operators is configured to perform one or more logical operations on the at least a portion of the data load as the at least a portion of the data load passes from one stream operator to a next stream operator in the one or more potential flow paths;

determining a conditional availability for each computing device of the plurality of computing devices;

identifying a change in one or more of a configuration of the plurality of computing devices and the at least a portion of the data load;

predicting, on at least one processor, a future change in one or more of the configuration of the plurality of computing devices and the at least a portion of the data load based upon, at least in part, the conditional availability for each computing device of the plurality of computing devices and observed historical application patterns;

dynamically activating, on the at least one processor, one or more potential overflow paths in response to the identified change based upon, at least in part, the conditional availability for each computing device of the plurality of computing devices and a tuple rate load balancing, the tuple rate load balancing designating an order of the data load, wherein the one or more potential overflow paths includes at least one duplicate stream operator based on the plurality of stream operators; and dynamically activating, on the at least one processor, the one or more potential overflow paths in anticipation of the predicted future change, wherein the one or more potential overflow paths includes the at least one duplicate stream operator based on the plurality of stream operators, and wherein dynamically activating the one or more potential overflow paths in anticipation of the predicted future change includes creating dynamic connections to the at least one duplicate stream operator.

8. The computer program product of claim 7, further comprising instructions for:

streaming a first portion of the data load through the plurality of stream operators deployed on the plurality of computing devices via an original path; and streaming a second portion of the data load through the plurality of stream operators deployed on the plurality of computing devices via a first overflow path of the one or more potential overflow paths in response to the identified change based upon, at least in part, the conditional availability for each computing device of the plurality of computing devices, wherein the data load is divided between the original path and the first overflow path.

9. The computer program product of claim 7, further comprising instructions for:
sampling one or more system state variables of each computing device of the plurality of computing devices during run time of one or more streaming applications, wherein the one or more sampled system state variables include one or more of CPU capability, memory capability, disk utilization, I/O capability, and virtual memory capability.

10. The computer program product of claim 9, further comprising instructions for:
generating one or more best fit models for application patterns based upon, at least in part, the sampled system state variables of each computing device, wherein the one or more best fit models are configured for one or more of duplicating stream operators, creating and removing dynamic connections, and optimizing graph flows.

11. The computer program product of claim 7, wherein dynamically activating one or more potential overflow paths in response to the identified change includes dynamically activating one or more potential overflow paths in response to the predicted change based upon, at least in part, the conditional availability for each computing device of the plurality of computing devices.

12. The computer program product of claim 11, further comprising instructions for:
creating one or more pools of computing devices having one or more common characteristics; and
dynamically interchanging one or more computing devices included in at least one of the potential overflow paths with one or more computing devices from the same pool of the one or more pools of computing devices in response to the identified change based upon, at least in part, the conditional availability for each computing device of the plurality of computing devices.

13. A computing system comprising:
a processor and a memory module coupled with the processor, the processor being configured for:
defining one or more potential overflow paths for processing at least a portion of a data load through a plurality of stream operators deployed on a plurality of computing devices, wherein each stream operator of the plurality of stream operators is configured to perform one or more logical operations on the at least a portion of the data load as the at least a portion of the data load passes from one stream operator to a next stream operator in the one or more potential flow paths;
determining a conditional availability for each computing device of the plurality of computing devices;
identifying a change in one or more of a configuration of the plurality of computing devices and the at least a portion of the data load;
predicting, on at least one processor, a future change in one or more of the configuration of the plurality of computing devices and the at least a portion of the data load based upon, at least in part, the conditional availability for each computing device of the plurality of computing devices and observed historical application patterns;
dynamically activating, on the at least one processor, one or more potential overflow paths in response to the identified change based upon, at least in part, the conditional availability for each computing device of the plurality of computing devices and a tuple rate load balancing, the tuple rate load balancing designating an order of the data load, wherein the one or more potential overflow paths includes at least one duplicate stream operator based on the plurality of stream operators; and
dynamically activating, on the at least one processor, the one or more potential overflow paths in anticipation of the predicted future change, wherein the one or more potential overflow paths includes the at least one duplicate stream operator based on the plurality of stream operators, and wherein dynamically activating the one or more potential overflow paths in anticipation of the predicted future change includes creating dynamic connections to the at least one duplicate stream operator.

14. The computing system of claim 13, wherein the processor is further configured for:
streaming a first portion of the data load through the plurality of stream operators deployed on the plurality of computing devices via an original path; and
streaming a second portion of the data load through the plurality of stream operators deployed on the plurality of computing devices via a first overflow path of the one or more potential overflow paths in response to the identified change based upon, at least in part, the conditional availability for each computing device of the plurality of computing devices, wherein the data load is divided between the original path and the first overflow path.

15. The computing system of claim 13, wherein the processor is further configured for:
sampling one or more system state variables of each computing device of the plurality of computing devices during run time of one or more streaming applications, wherein the one or more sampled system state variables include one or more of processing capability, memory capability, disk utilization, I/O capability, and virtual memory capability.

16. The computing system of claim 15, wherein the processor is further configured for:
generating one or more best fit models for application patterns based upon, at least in part, the sampled system state variables of each computing device, wherein the one or more best fit models are configured for one or more of duplicating stream operators, creating and removing dynamic connections, and optimizing graph flows.

17. The computing system of claim 13, wherein dynamically activating one or more potential overflow paths in response to the identified change includes dynamically activating one or more potential overflow paths in response to the predicted change based upon, at least in part, the conditional availability for each computing device of the plurality of computing devices.

* * * * *